(12) United States Patent
Schaller et al.

(10) Patent No.: US 11,319,958 B2
(45) Date of Patent: May 3, 2022

(54) FILTERING ELEMENT AND ASSOCIATED MOUNTING DEVICE FOR VACUUM PUMP

(71) Applicant: Ateliers Busch SA, Chevenez (CH)

(72) Inventors: Christian Schaller, Rossemaison (CH); Yannick Laversin, Hérimoncourt (FR); Erik Lippelt, Inzlingen (DE); Jan Eibisch, Lörrach (DE)

(73) Assignee: Ateliers Busch SA, Chevenez (CH)

( * ) Notice: Subject to any disclaimer, the term of this patent is extended or adjusted under 35 U.S.C. 154(b) by 658 days.

(21) Appl. No.: 15/777,717

(22) PCT Filed: Dec. 1, 2016

(86) PCT No.: PCT/EP2016/079509
§ 371 (c)(1),
(2) Date: May 21, 2018

(87) PCT Pub. No.: WO2017/093441
PCT Pub. Date: Jun. 8, 2017

(65) Prior Publication Data
US 2018/0335033 A1    Nov. 22, 2018

(30) Foreign Application Priority Data

Dec. 1, 2015    (WO) ................. PCT/EP2015/078226

(51) Int. Cl.
*F04C 29/00*    (2006.01)
*B01D 46/00*    (2006.01)
(Continued)

(52) U.S. Cl.
CPC ...... *F04C 29/0092* (2013.01); *B01D 46/0041* (2013.01); *B01D 46/0047* (2013.01);
(Continued)

(58) Field of Classification Search
None
See application file for complete search history.

(56) References Cited

U.S. PATENT DOCUMENTS 1,769,153 A    7/1930 Meyer
4,350,592 A    9/1982 Kronsbein
(Continued)

FOREIGN PATENT DOCUMENTS

EP    0063656 A1    11/1982
EP    0538973 A1    4/1993
(Continued)

OTHER PUBLICATIONS

International Search Report for PCT/EP2016/079509, dated Apr. 6, 2017, 5 pages.

*Primary Examiner* — Christopher P Jones
*Assistant Examiner* — Brit E. Anbacht
(74) *Attorney, Agent, or Firm* — Praedcere Law (57) ABSTRACT

A vacuum pump includes a casing having a first inlet orifice and a second outlet orifice to allow a flow of air, and in the interior of which a filtering element is mounted in a removable way. At least one orifice of the casing selected from among the first inlet orifice and the second outlet orifice is located on an exhaust lid. The exhaust lid is removable from the casing but integral with the filtering element. The connection between the casing and the exhaust lid is not tight. A cartridge for the vacuum pump includes an exhaust lid integrated in the closure nozzle of the filtering element. The connection between the casing and the exhaust lid is not tight.

20 Claims, 4 Drawing Sheets

(51) Int. Cl.
  *B01D 46/24* (2006.01)
  *F04C 29/12* (2006.01)
  *B01D 46/42* (2006.01)
  *F04C 29/06* (2006.01)
  *F04C 25/02* (2006.01)
  *F04C 18/344* (2006.01)
  *F04C 18/34* (2006.01)

(52) U.S. Cl.
  CPC ..... *B01D 46/2414* (2013.01); *B01D 46/4236* (2013.01); *F04C 25/02* (2013.01); *F04C 29/065* (2013.01); *F04C 29/12* (2013.01); *B01D 2273/28* (2013.01); *F04C 18/34* (2013.01); *F04C 18/344* (2013.01); *F04C 29/06* (2013.01); *F04C 2220/10* (2013.01); *F04C 2240/30* (2013.01); *F04C 2240/805* (2013.01)

(56) References Cited

U.S. PATENT DOCUMENTS

| | | | | |
|---|---|---|---|---|
| 6,152,713 | A | 11/2000 | Hisanaga | |
| 6,833,023 | B1* | 12/2004 | Vandenberghe | B01D 29/906 55/337 |
| D583,389 | S* | 12/2008 | Bilger | D15/7 |
| 10,441,913 | B2* | 10/2019 | Billiet | B21C 23/085 |
| 2003/0226795 | A1* | 12/2003 | Merritt | B01D 29/96 210/238 |
| 2003/0226800 | A1* | 12/2003 | Brown | B01D 35/31 210/497.01 |
| 2007/0113525 | A1* | 5/2007 | Gierer | B01D 46/4227 55/467 |
| 2007/0209341 | A1* | 9/2007 | Pearson | B01D 46/0045 55/418 |
| 2007/0271884 | A1* | 11/2007 | Pearson | B01D 46/0031 55/410 |
| 2008/0168903 | A1* | 7/2008 | Lane | B01D 46/2414 96/152 |
| 2009/0071111 | A1* | 3/2009 | Lundgren | B01D 46/2414 55/385.4 |
| 2009/0241489 | A1* | 10/2009 | Becker | B01D 46/003 55/320 |
| 2009/0249754 | A1* | 10/2009 | Amirkhanian | B01D 46/008 55/357 |
| 2010/0037570 | A1* | 2/2010 | Osendorf | B01D 46/521 55/355 |
| 2010/0050877 | A1* | 3/2010 | Bilger | F04C 29/026 96/187 |
| 2010/0058722 | A1* | 3/2010 | Andersson | B01D 46/4272 55/415 |
| 2010/0058930 | A1* | 3/2010 | Schuster | B01D 46/446 96/421 |
| 2014/0230384 | A1* | 8/2014 | Girondi | F02M 35/10334 55/419 |
| 2016/0108866 | A1* | 4/2016 | Dewit | B01D 46/527 55/385.3 |
| 2017/0014746 | A1* | 1/2017 | Smith | B01D 46/0005 |
| 2017/0319998 | A1* | 11/2017 | Girondi | B01D 46/2407 |
| 2018/0250625 | A1* | 9/2018 | Pflueger | B01D 46/10 |
| 2018/0361298 | A1* | 12/2018 | Girondi | F02M 35/0215 |
| 2019/0201826 | A1* | 7/2019 | Luchesi De Almeida | B01D 46/2414 |
| 2019/0308123 | A1* | 10/2019 | Neef | B01D 46/2414 |
| 2019/0308124 | A1* | 10/2019 | Neef | B01D 35/30 |
| 2020/0197849 | A1* | 6/2020 | Lucas | B01D 46/0045 |
| 2020/0291907 | A1* | 9/2020 | Koronai | F02M 35/0214 |
| 2020/0309125 | A1* | 10/2020 | Yamazaki | F04C 18/0215 |
| 2020/0346152 | A1* | 11/2020 | Rieger | B01D 45/16 |
| 2020/0384395 | A1* | 12/2020 | Ouweleen | B01D 29/15 |

FOREIGN PATENT DOCUMENTS

| | | |
|---|---|---|
| EP | 1034830 A2 | 9/2000 |
| FR | 2255933 A1 | 7/1975 |
| JP | H10159781 A | 6/1998 |
| WO | WO 2008146045 A1 | 12/2008 |

* cited by examiner

FILTERING ELEMENT AND ASSOCIATED MOUNTING DEVICE FOR VACUUM PUMP

TECHNICAL FIELD OF THE INVENTION

The present invention relates to the field of vacuum pumps. More specifically, it concerns a special mounting device for filtering elements in the casing of such a pump.

STATE OF THE ART

Vacuum pumps are already known, and in particular lubricated vane-type rotary vacuum pumps in which the filtration of the oil is based on the principle of coalescence. A flow of air loaded with oil circulates from an inlet of a casing, in which a filtering element is mounted, towards an outlet, from where it comes out again free of oil mist. The filtering elements generally take the shape of cylindrical cartridges typically provided with an entrance nozzle at an inlet of the casing and a watertight inner bottom in such a manner that the flow of air traverses the cylindrical walls before being directed towards an exhaust lid situated in principle on the opposite side from the entrance nozzle with respect to the axis of the cylinder. The cartridge can be kept in place in the casing with the aid of elastic elements or can be fixed on the entrance wall of the chamber by means of the inlet nozzle.

In order to increase the filtering capacity and in parallel the duration of the life of the filtering elements, there exist solutions according to which a plurality of cartridges are mounted in parallel inside a casing, such as disclosed, for example, in the document EP1 034 830 where the latter are mounted side by side on an inner wall of the casing. This particular arrangement where the nozzle of the cartridges is no longer directly connected to the inlet of the casing implies an inversion of the flow of air from the outside toward the inside of the cylindrical walls of the cartridges even though the flow always takes place along the axis of the cylinder, and the replacement of the cartridges there is relatively tedious.

Consequently there exists a need for a solution free of these known limitations.

SUMMARY OF INVENTION

One object of the present invention is to permit in particular an easier and more practical assembly and disassembly of the filtering elements in the casing of the pump.

According to the invention, these objects are achieved by means of a vacuum pump comprising a casing in which are disposed a first inlet orifice and a second outlet orifice to allow the flowing of a flow of air, and in the interior of which a filtering element is mounted in a removable way. The assembly is characterized in that at least one orifice of the casing selected from among the first inlet orifice and the second outlet orifice is disposed on an exhaust lid which is at the same time removable from the said casing, but integral with the filtering element and in that the connection between the casing and the exhaust lid is not tight.

These objects are likewise attained by means of a cartridge comprising a filtering element adapted for such a vacuum pump, taken alone as modular element: in effect, the filtering element is likely to be replaced often in the course of the life of the pump. Such a modified cartridge comprises a filtering element provided with an inlet nozzle and a closure nozzle disposed each on one side of an intermediate filtering part, and it is characterized in that the exhaust lid is integrated in the closure nozzle of the filtering element.

One advantage of the proposed solution is that it allows simultaneous mounting of the filtering element and of the exhaust lid in the pump, which enables not just savings in terms of labor, but likewise in terms of costs and efficiency since no special arrangement is necessary anymore in particular inside the pump for the essential fixation of the closure nozzle of the filtering element and the axial support thereof. According to a special advantageous embodiment, the exhaust lid and the closure nozzle are realized as a single piece in order to facilitate the machining.

According to preferred embodiments, the exhaust lid is connected to the closure nozzle with the aid of a connector, which acts as coupling piece. Whether or not this connector on the one hand and the exhaust lid and the closure nozzle on the other hand are designed as a single piece, it preferably allows other functions to be integrated such as that of an anti-noise filter, in order to combat more effectively the noises caused by the pump, or moreover an oil filter through the agency of a baffle to prevent big drops from being able to reach the exhaust outlet. According to a preferred variant, the shape of the baffle and its arrangement between the closure nozzle and the exhaust lid enables these two elements, i.e. the oil filter and the anti-noise filter, to be combined into a single same piece, which allows additional operational gains. Moreover an alignment means can preferably be provided for mounting the baffle in such a way that it is oriented in the right direction.

According to other preferred embodiments, a handle can be integrated in the lid in order to further facilitate the operations of assembly and disassembly. Moreover, the coupling piece between the exhaust lid and the fixation nozzle can likewise have guide surfaces in order to facilitate the insertion and the removal of the filtering element into and from the pump.

It will be understood from the detailed description which follows that the advantageous features taken from preferred embodiments can be taken alone or in combination.

BRIEF DESCRIPTION OF THE DRAWINGS

Other advantageous features emerge more clearly from the description which follows of a special embodiment of the invention given by way of nonlimiting example and represented by the attached drawings, in which.

DETAILED DESCRIPTION

Figure 1:
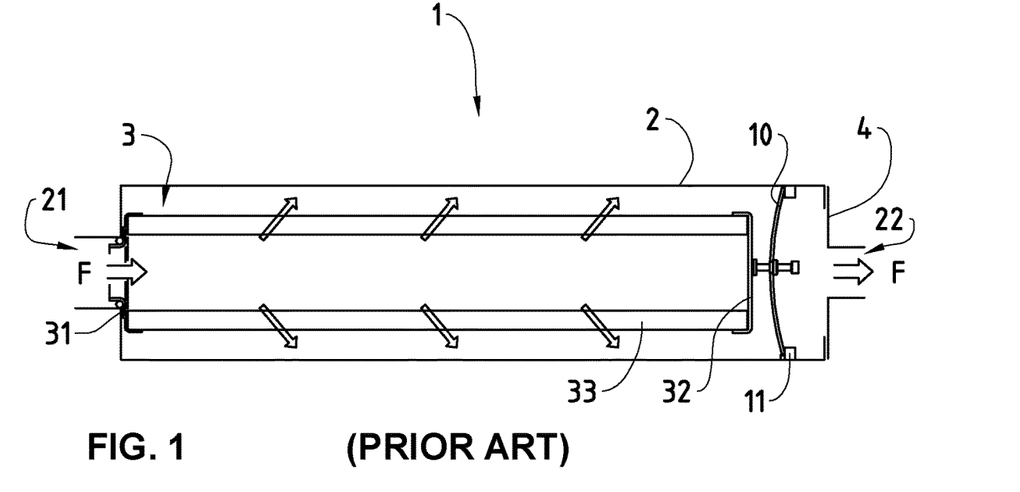
FIG. 1 is a schematic view of a vacuum pump containing a filtering cartridge according to the prior art.

FIG. 1 illustrates a filtering element 3 taking the form of a cartridge mounted in the casing 2 of a vacuum pump 1 according to one known solution in the prior art. The filtering element 3 comprises an inlet nozzle 31, mounted at a first inlet orifice 21 of the casing 2 of the pump, and a closure nozzle 32 between which is mounted a filtering part 33 through which the flow of air, marked by the arrows F, is directed, which is then directed towards an outlet orifice 22 of the casing 2. The outlet orifice 22 of the casing 2 is arranged here in the center of a removable lid whose opening allows the insertion and the removal of the filtering element 3 inside the casing 2 of the vacuum pump 1. Due to the second orifice 22 and the flow of air F which traverses this closure lid, this element is generally called an exhaust lid (or flange) 4.

O-ring type seals and guide surfaces are generally provided at the inlet orifice 21 of the casing 2 and at the inlet nozzle 31 of the filtering cartridges to facilitate their mounting at this end, and to ensure the media tightness in order to ensure the good functioning of the vacuum pump 1.

In order to ensure the maintaining of the filtering cartridge in position in the casing 2, an adjustable elastic fixation element 10 comes to press against the rear face of the closure nozzle 32 of the cartridge, and it is retained moreover axially by the lateral shoulders 11 arranged on the inner face of the casing 2. Consequently, the replacement of a cartridge requires, on the one hand, the dismantling of the exhaust lid 4 with respect to the casing 1, then of the adjustable elastic fixation element 10 in order to free the filtering cartridge, which is tedious.

Figure 2:
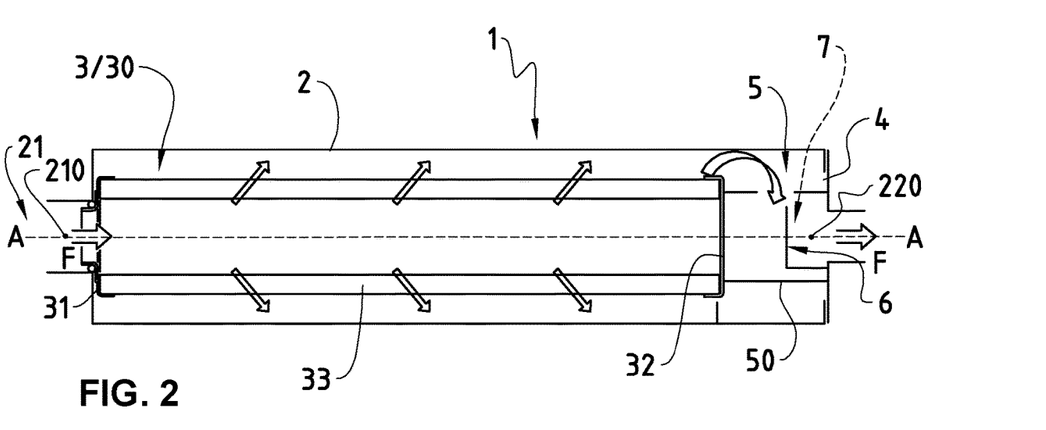
FIG. 2 is a schematic view of a vacuum pump containing a new filtering element according to the present invention.

FIG. 2 illustrates a schematic view of a modified cartridge 30 mounted in the casing 2 of a vacuum pump 1. This modified cartridge 30 henceforth comprises not just a filtering element 3, but also an integrated exhaust lid 4, which permits these drawbacks to be overcome.

The cartridge 30 henceforth encompasses the filtering element 3, whose body has a symmetry axis A-A aligned on the axis of the first inlet orifice 21 and of the second outlet orifice 22, that is to say their respective centers (i.e. the first center 210 of the first inlet orifice 21 and the second center of the second outlet orifice 220). The filtering element 3 still comprises an inlet nozzle 31, and a tight closure nozzle 32 to direct the flow of air F towards the lateral walls of the intermediate filtering part 33. However, the closure nozzle 32 is now no longer kept in place inside the casing 2 by a dedicated fixation, but directly through the fixation of the exhaust lid 4 on the casing 2 itself. In effect, as can be noted in FIG. 2, a coupling piece which is called here a "connector" 5 connects the closure nozzle 32 with the exhaust lid 4 in such a way that a fixation of the latter on the casing 2 determines at the same time the positioning of the filtering element 3. The indirect fixation by means of the exhaust lid 4 thus makes it possible to save one operation during the putting in place and the exchange of the cartridge in the casing 2.

Figure 3:
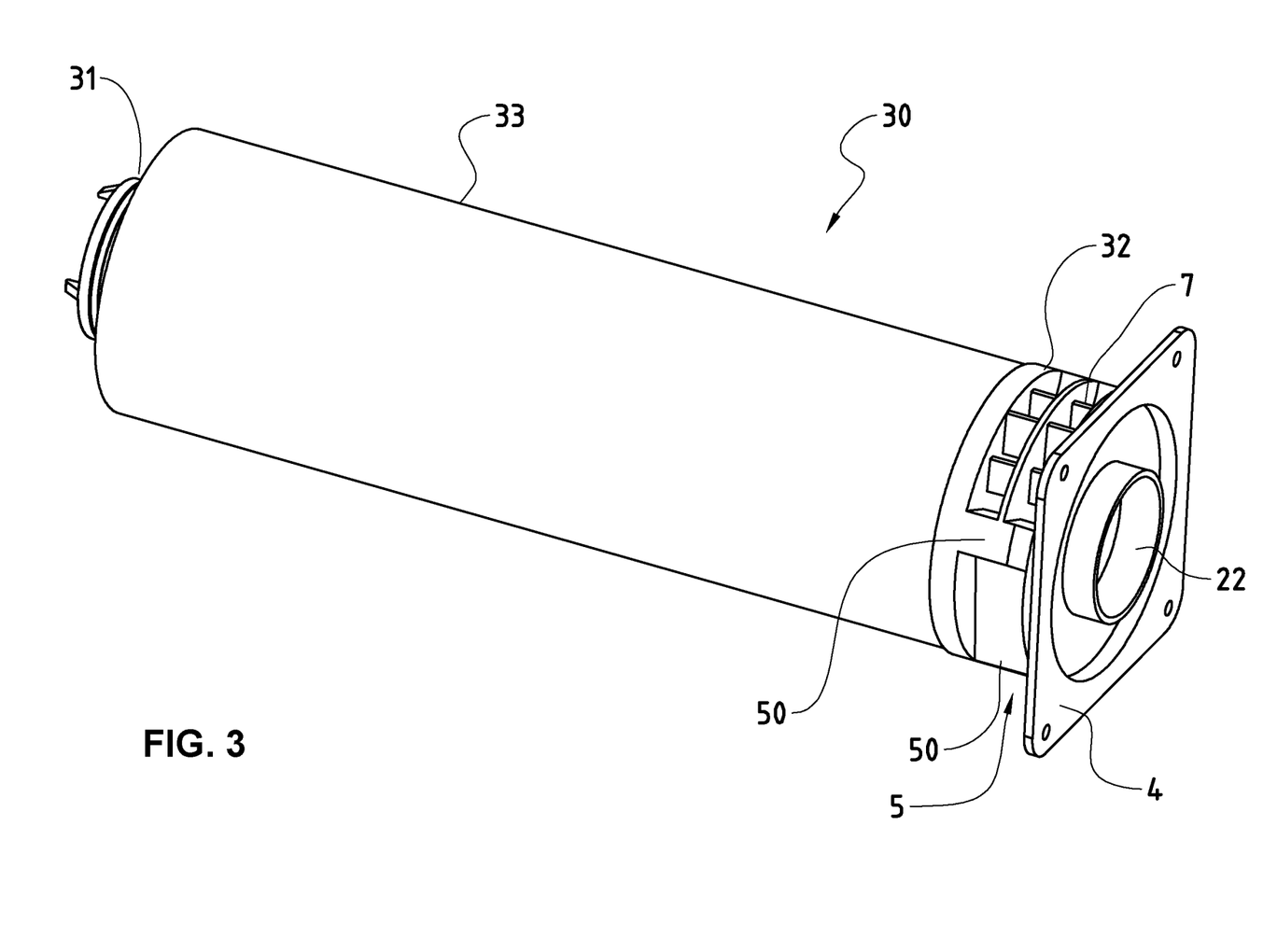
FIG. 3 is a three-dimensional view of a cartridge used as filtering element according to a first preferred embodiment for the present invention.

According to preferred embodiment illustrated by FIG. 3 for the modified cartridge 30, the body of the filtering element 3 is preferably cylindrical, in order to facilitate an isotropic flow of fluid. The alignment of the symmetry axis A-A of the cylinder on that of the inlet and outlet orifices of the casing (reference numerals 21 and 22 respectively) moreover makes it possible to arrange guide surfaces 50 along the connector 5 in the partial prolongation of the cylinder in order to facilitate the operations of insertion and removal of the modified cartridge 30 in the casing 2. Such guide surfaces 50 are thus easy to machine, for example by injection or molding, and contribute even more to the simplification of the operations of assembly and disassembly. For such guide surfaces 50 along the axis A-A, other symmetrical geometric shapes, for example of the parallelepiped type are however likewise conceivable for the body of the filtering element 3, and the partial prolongation of these geometric shapes can thus form little beams or feet oriented along the axis A-A at its periphery.

In FIG. 2, it can be noted that a baffle 6 is arranged in the space between the closure nozzle 32 and the exhaust lid 4. This baffle 6 has the purpose of preventing big drops of oil formed through coalescence at the exit of the filtering element 3 in the direction of the flow of air marked by the big arrow which pass behind the closure nozzle 32 from reaching the exhaust lid 4. The baffle 6 here is connected to the inner wall of the exhaust lid 4, but could also be arranged at the connector 5 itself, the underlying idea being to integrate this baffle 6 in the modified cartridge 30 in such a way that it fulfils a supplementary function without requiring another dedicated piece therefor.

It is however very important to mention that, thanks to the structure of the cartridge 30 mentioned above, the connection between the casing 2 and the exhaust lid 4 does not necessarily have to be tight. However, the tight closure of the casing 2 is not detrimental to good functioning of the modified cartridge 30, and gaskets or similar devices can likewise be used.

The presence of a noise suppressor device 7, arranged in the same space between the closure nozzle 32 and the exhaust lid 4, can also be discerned in FIG. 2. The noise suppressor 7 is indicated, according to this preferred embodiment, with the aid of an arrow of broken lines because it is preferably formed at the baffle 6 itself. If the molding device allows, the noise suppressor 7 and the baffle 6 can be designed as a single piece, which in this case serves in parallel the function of "muffler" at the exit of the casing 2 of the vacuum pump 1, and this by possibly supplementing noise-attenuating devices arranged ordinarily at the inlet, such as, for example, the anti-noise valve 9 visible in FIG. 4C described in the following.

FIG. 3 illustrates a modified cartridge 30 according to a preferred embodiment of the invention, according to which the body of the filtering element 3 is cylindrical and it is connected to an exhaust lid 4 of square shape and in the periphery of the corners of which four holes have been provided for insertion of fixation screws. The outlet orifice 22 is round in order to allow an easy connection, for example to an exit pipe. Thus the modified cartridge 30 remains symmetrical with respect to the axis of the filtering element 3 constituted by the inlet nozzle 31, the closure nozzle 32 and the intermediate filtering part 33. The square shape as well as the dimensions of the exhaust lid are preferably selected to correspond to the usual shape of existing flasks and thus to facilitate the flattening against the contact surface of the pump 1 at the time of assembly as well as to facilitate the configuration of alignment devices on its periphery. It will be understood however this it is likewise possible to envisage mounting ears in the form of tongues projecting towards the exterior, and which will be spaced regularly about circular arcs of the same length, or even other suitable, preferably symmetrical, geometric shapes.

According to this preferred embodiment, the exhaust lid 4 and the closure nozzle 32 are designed as a single piece, such that the connector 5 constitutes here only one hypothetical intrinsic piece because it is impossible to determine where this intermediate coupling piece begins behind the closure nozzle 32 and where it stops at the lid. One can however distinguish, in this intermediate space, the guide surfaces 50 in the prolongation of the cylinder.

The material used to achieve the end of this cartridge 30 by molding can consist, for example, of polyamide or of polypropylene, or of any suitable material able to support a flow of air circulating at about 80° C. Furthermore a conductible material will preferably be chosen, such as, for example, polypropylene with insertion of stainless steel fibers in order to reduce as much as possible the level of static electricity.

Notable moreover in FIG. 3 is the presence of a grating above the baffle 6 in the available space between the closure nozzle 32 and the exhaust lid 4. This grating constitutes an advantageous variant for realization of the noise suppressor 7, illustrated previously in FIG. 2: in effect, this permits, on the one hand, the exhaust flow to be guided, and, on the other hand, the sound level to be reduced, thanks to the successive passage of the flow of air in the smaller sections and then in the bigger ones. Furthermore, instead of letting the air calm down through a big hole, the fact that it is separated into a certain number of small holes or slots, increases the frequency of the generated sound, the range of which is more restricted, and thus contributing to achieving the same object sought of reduction of the noises. Finally, this grating permits a laminar flow to be created, eliminating the turbulence normally generated during the blowing, and consequently reducing even more the noise level.

This preferred embodiment illustrated by FIG. 3 for the noise suppressor 7 has moreover two technical advantages: the first consists in achieving the function of anti-noise attenuation at the outlet without any piece necessitating a dedicated supplementary volume having to be specifically provided for this effect, thus reducing the bulkiness, and the second being, in the case where the grating is designed in a modular way with respect to the connector 5 and the baffle 6, to simplify its manufacturing process as well as make its replacement independent from that of the pieces in which it has the purpose of being inserted. It will nevertheless be understood that regardless of whether the noise suppressor is designed in modular fashion or not with respect to the other pieces, and in particular the baffle 6, forms other than that of the grating illustrated in FIG. 3 could be chosen with a view to reduce noise without departing from the scope of the present invention.

In the following FIGS. 4A, 4B, 4C and 4D will likewise be referred to for the detailed description of the modified cartridge illustrated in three dimensions in the preceding FIG. 3. For reasons of clarity, the noise suppressor grating 7 has no longer been represented there, however.

In FIG. 4A, one finds again all the reference numerals of FIG. 3, except for the noise suppressor 7, and only the guide surfaces 50 are marked on the periphery of the connector 5. Even though the baffle 6 is not discernible in its entirety in this figure, it can be noted in FIG. 4B that an alignment system formed by separate pairs of holes for the screwing of the exhaust lid 4 to the casing 2 is provided, namely here two first screw holes 41, and two second screw holes 42 having distinct spacings; in this case, the spacing between the first pair of first screw holes 41 is slightly smaller than that between the second pair of second screw holes 42. Such an alignment system makes it possible to correctly align the baffle 6 in the interior of the casing 2 so that the roof—constituted here by the lateral spoilers 61 well visible in FIG. 4D, and which form an integral part there—is correctly oriented, allowing drops of oil to be retained formed by gravity at the outlet of the exhaust filter. Other alignment systems are likewise conceivable, for example with the aid of a bayonet mounting, or with a different number of screws and other geometric shapes for the exhaust lid 4; nevertheless this proposed variant with the aid of pairs of holes and separate screws has the advantage of particularly simple implementation.

Figure 4A:
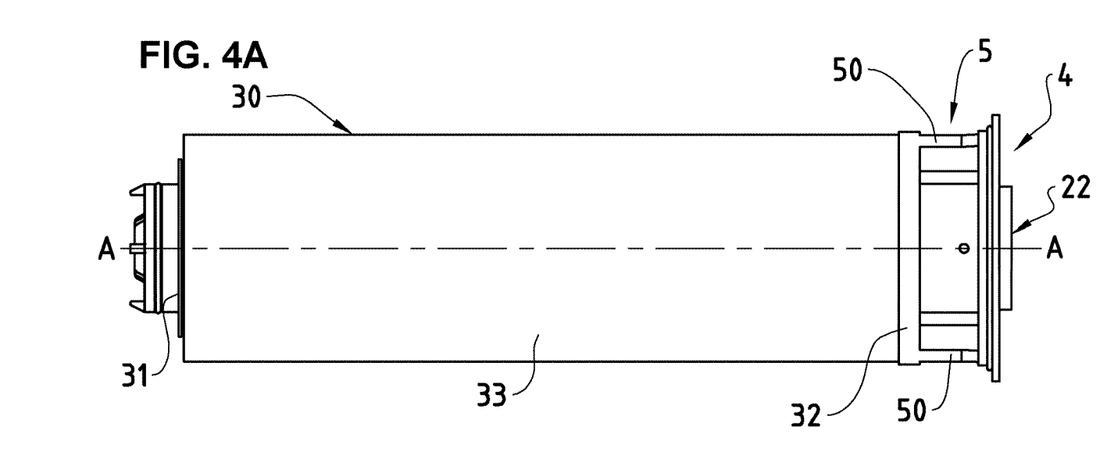
FIGS. 4A, 4B, 4C and 4D represent different views of the cartridge represented in FIG. 3, i.e. a view from above (FIG. 4A), a sectional view along the axis A-A of FIG. 4A (FIG. 4B), a view from the rear of the exhaust lid (FIG. 4C) and finally a sectional view at the connector, along the axis C-C of FIG. 4B (FIG. 4D.
Figure 4B:
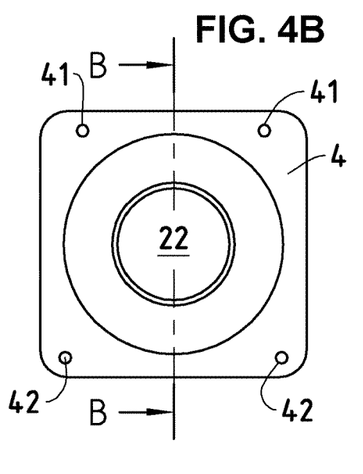
Figure 4C:
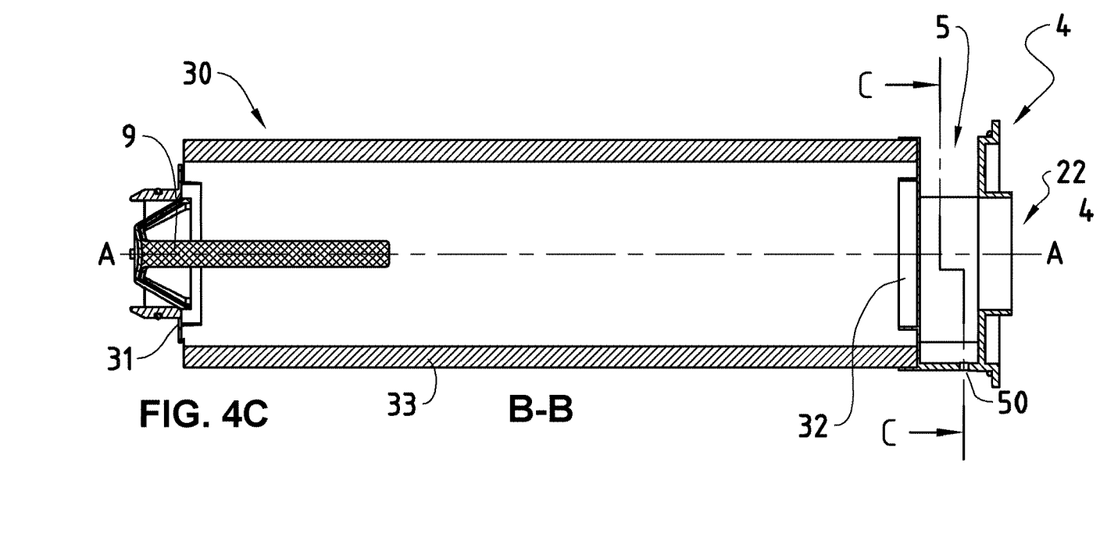
Figure 5:
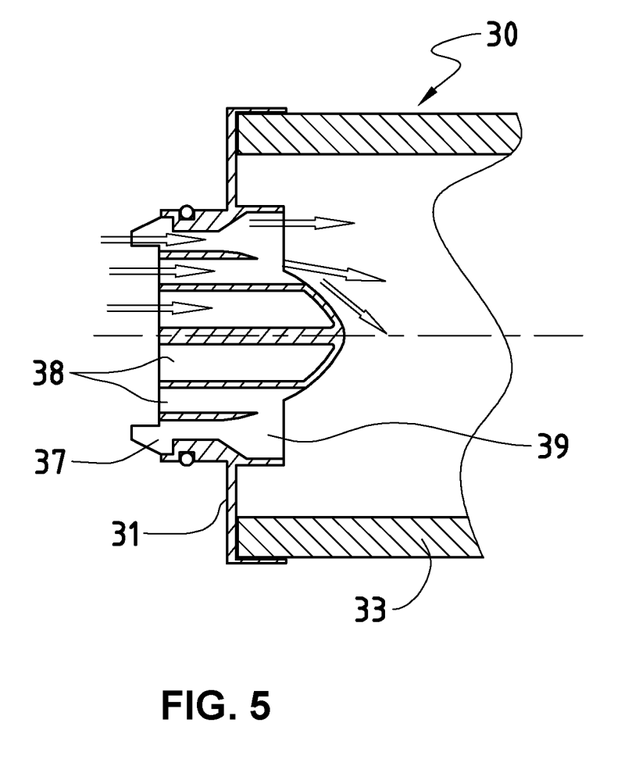
FIG. 5 is an enlarged schematic view of the inlet end of a cartridge used as filtering element according to a second preferred embodiment of the present invention.

FIG. 4C in the sagittal sectional plane B-B makes it possible to mark an anti-noise valve 9 at the inlet nozzle 31 of the filtering element 3, which makes it possible, together with the noise suppressor at the outlet 7 (not illustrated in this figure), to maximize the soundproofing performance of the working of the pump with respect to the outside. Another possibility for reduction of noise at the inlet nozzle 31 of the filtering element 3 is represented in FIG. 5. In this embodiment of the invention, the noise limitation valve 9 illustrated in FIG. 4C can be replaced by a reduction of the section of passage for the flow of air. As can be seen in FIG. 5, the air (represented by the arrows) penetrates into the interior of the filtering element 3 through a circular ring 37 and a series of bores 38 in such a way that the flow of air passing through the circular ring 37 quickly expands thanks to the widening 39. This flow of air then rejoins the air passing through the bores 38 in a tangential way by pressing it on the conical surface likewise represented in FIG. 5. This arrangement makes it possible to have the same noise damping as with using the movable valve 9 while making it possible to achieve the assembly in one single easy-to-machine piece. The reliability is also improved since one no longer has static pieces in the filtering element 3.

Figure 4D:
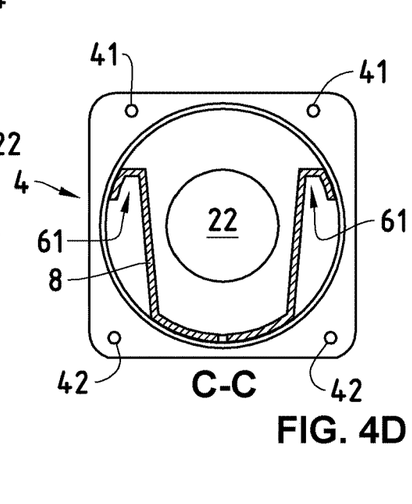

Returning to the embodiment represented in FIG. 4C, a guide surface 50 can still be discerned there in the prolongation of the bottom of the cylinder, as well as a vertical sectional plane C-C in the intermediate space between the fixation nozzle 32 and the exhaust lid 4 which allows a handle profile 8 to be marked, integrated in the connector 5, visible in FIG. 4D. This handle 8 thus integrated in the back of the exhaust lid 4 is consequently hidden by the latter, as FIG. 4B demonstrates which shows a view from the exterior, and thus has an advantage of aesthetic order, as well as a reduction in terms of bulkiness and thus advantages in terms of compactness. Such a configuration likewise allows facilitation of the connection by a possible connector at the outlet.

The integrated handle 8 has a particular shape, here in the form of a "U", not interfering, on the one hand, with the prolongation of the orifice (that is to say, according to the embodiment, the second outlet orifice 22 of the said exhaust lid 4) so as not to disrupt the flow of fluid during normal operational mode of the vacuum pump 1. Such a "U" shape allows a particularly easy and intuitive grip to be maintained by the user, like a drawer: it suffices for his fingers to be introduced in the outlet orifice 22 and then to pull the exhaust lid 4 toward him.

According to this described preferred embodiment, the integrated handle 8 is also designed in an integral way, that it to say in one piece with the closure nozzle 32 and the exhaust lid 4. It thus forms an integral part of a hypothetical coupling piece between these two elements and as such, one can consider in a preferable way designing the integrated handle 8 and the connector 5 as a single piece, which makes it possible to simplify the machining process.

Although in the foregoing description the preferred embodiment illustrated refers to a structure of monobloc type (i.e. realized as a single piece) for the cartridge 30 proposed within the scope of the present invention, it will be easily understood that other variants are possible for assembly of the different constituent parts of this cartridge 30 relating to different technical functions that they fulfil without departing from the scope of invention. It is in notably possible to achieve all the pieces of the cartridge 30 independently and to provide suitable means of attachment to allow their assembly. A cartridge 30 composed of such "detached pieces" and these "detached pieces" for the cartridge 30 likewise forms part of the present invention in the same way as the cartridge 30 achieved in a monobloc manner. Moreover, other geometric, preferably symmetrical, shapes, are likewise conceivable for the exhaust lid and the filtering element. Furthermore, the determination of the inlet and outlet orifices of the casing has been made conventionally with respect to the usual flow of air, but it is likewise possible to envisage pumping devices which would involve an inverted flow of air making the air pass from the outside toward the inside of the filtering cartridge.

| List of reference numerals | |
| --- | --- |
| 1 | vacuum pump |
| 2 | casing |
| 21 | inlet orifice |
| 210 | center of inlet orifice |
| 22 | outlet orifice |
| 220 | center of outlet orifice |
| 3 | filtering element |
| 30 | modified cartridge |
| 31 | inlet nozzle |
| 32 | closure nozzle |
| 33 | intermediate filtering part |
| 37 | circular ring |
| 38 | bore(s) |
| 39 | widening |
| 4 | exhaust lid |
| 41 | first screw holes |
| 42 | second screw holes |
| 5 | connector (coupling piece) |
| 50 | guide surfaces |
| 6 | baffle |
| 61 | retaining spoiler |
| 7 | noise suppressor (rear) |
| 8 | handle |
| 9 | anti-noise valve (front) |
| 10 | elastic fixation element |
| 11 | retaining tabs |
| A-A | axis of the cartridge |
| B-B | first sectional plane |
| C-C | second sectional plane |
| F | flow of air |

The invention claimed is:

1. Vacuum pump comprising
a casing in which are disposed a first inlet orifice and a second outlet orifice to allow a flow of air,
a filtering element mounted in a removable way in the interior of said casing, said filtering element comprising a closure nozzle, wherein said filtering element further comprises an inlet nozzle and an intermediate filtering part, said inlet nozzle leading to an interior of said intermediate filtering part, said inlet nozzle and said closure nozzle each being disposed on an opposite side of said intermediate filtering part, and
an exhaust lid, said second outlet orifice being disposed on said exhaust lid, said exhaust lid being at the same time removable from said casing, but either being a single piece with said closure nozzle or attached to said closure nozzle, said exhaust lid being located adjacent to said closure nozzle, said exhaust lid being fastened to said casing,
wherein said closure nozzle is adapted to direct the flow of air towards a side wall of said filtering element permitting air to leave from a side of said filtering element into an interior of said casing and through said second outlet orifice.

2. Vacuum pump according to claim 1, comprising a handle integrated in the back of said exhaust lid.

3. Vacuum pump according to claim 2, said handle having a "U" shape not interfering with said first inlet orifice or the said second outlet orifice of said exhaust lid.

4. Vacuum pump according to claim 1 wherein the connection between said casing and said exhaust lid is not tight.

5. Vacuum pump according to claim 1, comprising a connector that fixes said exhaust lid to said closure nozzle.

6. Vacuum pump according to claim 5, wherein the assembly of said filtering element, said connector, and said exhaust lid, forms a cartridge having a symmetry axis, and the symmetry axis is coincident with a segment connecting a first center of said first inlet orifice to a second center of said second outlet orifice.

7. Vacuum pump according to claim 6, comprising guide surfaces in the direction of said symmetry axis provided in the prolongation of the geometric form of said filtering element of the said cartridge.

8. Vacuum pump according to claim 5, said exhaust lid and said connector being designed in an integral way, with said closure nozzle.

9. Vacuum pump according to claim 5, comprising a baffle adjacent to said connector or said exhaust lid.

10. Vacuum pump according to claim 9, said exhaust lid being provided with an alignment system in order to correctly align said baffle.

11. Vacuum pump according to claim 10, said exhaust lid being fastened to said casing with the aid of two pairs of screws inserted respectively in first screw holes and second screw holes of said exhaust lid, said first holes and second holes having respectively distinct spacings.

12. Vacuum pump according to claim 9, comprising a noise suppressor disposed between said closure nozzle and said second outlet orifice.

13. Cartridge for a vacuum pump, the vacuum pump including a casing in which are disposed a first inlet orifice and a second outlet orifice to allow a flow of air, comprising
a filtering element that is adapted to be mounted in a removable way in an interior of the casing, said filtering element comprising a closure nozzle, wherein said filtering element further comprises an inlet nozzle and an intermediate filtering part, said inlet nozzle leading to an interior of said intermediate filtering part, said inlet nozzle and said closure nozzle each being disposed on an opposite side of said intermediate filtering part, and
an exhaust lid, the second outlet orifice being disposed on said exhaust lid, said exhaust lid being adapted to be at the same time removable from the casing, but either being a single piece with said closure nozzle or attached to said closure nozzle, said exhaust lid being adapted to be fastened to the casing,
wherein said closure nozzle is adapted to direct the flow of air towards a side wall of said filtering element permitting air to leave from a side of said filtering element into an interior of the casing and through said second outlet orifice.

14. Cartridge for a vacuum pump according to claim 13, comprising a connector connecting said closure nozzle to said exhaust lid, and in addition a baffle disposed adjacent to said connector or said exhaust lid.

15. Cartridge for a vacuum pump according to claim 13 wherein the connection between the casing and said exhaust lid is not tight.

16. Vacuum pump comprising
a casing in which are disposed a first inlet orifice and a second outlet orifice to allow a flow of air, a filtering element mounted in a removable way in the interior of said casing, said filtering element comprising an intermediate filtering part and a closure nozzle, an inlet nozzle leading to an interior of said intermediate filtering part, wherein said inlet nozzle and said closure nozzle are each disposed on opposite ends of said intermediate filtering part, and an exhaust lid on which said second outlet orifice is disposed, said exhaust lid being at the same time removable from said casing, but either being a single piece with said closure nozzle or attached to said closure nozzle, said exhaust lid being fastened to said casing, a baffle that is arranged in a space between said closure nozzle and said exhaust lid, wherein a flow of air travels from said inlet nozzle in an interior of said intermediate filtering part and along a length of said intermediate filtering part until the flow of air is blocked by said closure nozzle, the air then flows out of a side wall of said filtering element around said closure nozzle where air flow behind said closure nozzle travels past said baffle and out said second outlet orifice.

17. The vacuum pump of claim 16 comprising a noise suppressor device disposed in the space between said closure nozzle and said exhaust lid.

18. The vacuum pump of claim 16 comprising a noise suppressor device disposed in the space between said closure nozzle and said exhaust lid, said baffle and said noise suppressor device being formed as one piece.

19. The vacuum pump of claim 16 comprising a handle integrated in the back of said exhaust lid, said handle having a "U" shape not interfering with said second outlet orifice of said exhaust lid.

20. The vacuum pump according to claim 16, comprising flat guide surfaces disposed in the space between said closure nozzle and said exhaust lid.

* * * * *